Jan. 19, 1926.  
T. F. BOYLAN, SR  
1,570,455  
METHOD OF MANUFACTURING HORSESHOE CALKS  
Filed Jan. 21, 1925

WITNESSES:
Cris Dinle.
Hugh H. Ott

INVENTORS,
Thomas F. Boylan, Sr
BY
ATTORNEYS.

Patented Jan. 19, 1926.

1,570,455

UNITED STATES PATENT OFFICE.

THOMAS F. BOYLAN, SR., OF NEW BRUNSWICK, NEW JERSEY, ASSIGNOR TO EVER-SHARP MANUFACTURING CO., OF NEW BRUNSWICK, NEW JERSEY, A CORPORATION OF NEW JERSEY.

METHOD OF MANUFACTURING HORSESHOE CALKS.

Application filed January 21, 1925. Serial No. 3,877.

*To all whom it may concern:*

Be it known that I, THOMAS F. BOYLAN, Sr., a citizen of the United States of America, and resident of New Brunswick, in the county of Middlesex and State of New Jersey, have invented a new and Improved Method of Manufacturing Horseshoe Calks, of which the following is a full, clear, and exact description.

This invention has relation to a method of manufacturing horseshoe calks, particularly of the blunt drive pattern, from high carbon steel wire by the cold process.

One of the objects is, the invention resides in a method of manufacturing a blunt drive pattern calk from a high carbon steel wire section by the cold process during which the wire is subjected to impact and pressure while cold which causes the same to flow in the presence of tools and dies to properly form and shape the same.

The invention as a further object comprehends a method of manufacturing blunt drive pattern calks by the cold process which method is extremely economical as compared with the drop forge process, and further embodies the features of simplicity and efficiency.

With the above recited and other objects in view reference is made to the following specification, the appended claims and the annexed drawings, in which Figure 1 is a view illustrating a piece of high carbon steel wire which has been cut off to the proper length.

Figure 1:
Figure 2:
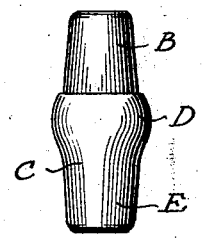
Fig. 2 is a side view illustrating the billet after the same has been operated upon to effect the initial forming of the shank and head.
Figure 3:
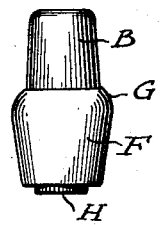
Fig. 3 is a similar view illustrating the next successive operation for further forming the head.
Figure 4:
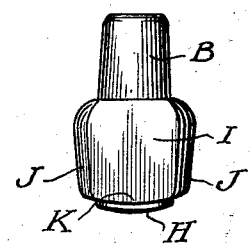
Fig. 4 is a side illustrating the final operation in finishing the head and the shank to their proper size and configuration.
Figure 5:
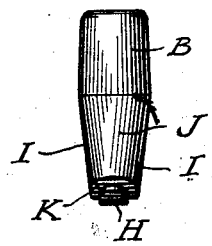
Fig. 5 is an edge view of the completed calk.
Figure 6:
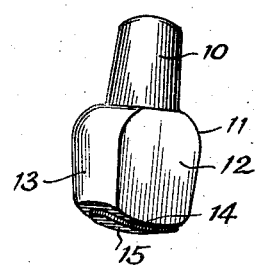
Fig. 6 is a perspective view thereof.

In practice the method consists in cutting the high carbon steel wire while cold into the proper length to produce the section indicated at A in Fig. 1 which is of substantially cylindrical configuration. The cutting of the lengths from the wire is preferably accomplished by a double stroke header. The section or billet A is then carried over and one end thereof is inserted or entered into a tapered die where the projecting end is struck with a punch tool to form the shank B to approximately its proper size and taper, said punch tool simultaneously forming the projecting portion C which is to constitute the head into the shape illustrated in Fig. 2 which defines at the juncture of the portion C with the shank B a bulge D while the remaining free end E is substantially frustro conical. The projecting end is further subjected to an impact stroke which changes the form of the head to that illustrated in Fig. 3 further upsetting the same to the frustro conical shape F having a rounded shoulder G at the juncture of its inner end with the shank and at the same time producing a reduced annular downwardly projecting boss H at its free outer end. The shank B of the billet is then inserted in a finishing tapered die preferably of a toggle press and the head portion is subjected to pressure between sliding jaws which exerts simultaneously a pressure on the shank within the die to finish the same to its proper size and tapered and at the same time to produce flattened opposite side faces I on the head portion which faces converge outwardly leaving rounded end surfaces or walls J and an arcuate or convex lower end surface K. The boss H also assumes a shape conforming approximately to the configuration of the head but of a reduced size.

From the foregoing it will thus be seen that the herein described method of manufacturing blunt drive pattern horseshoe calks by the cold process consists essentially in cutting off a length of high carbon steel wire while cold into the required lengths entering one end of each of said lengths into a tapered die, initially subjecting the projecting ends of said lengths to the impact of a tool for forming a tapered shank at one end of each section which is approximately the proper size and taper while simultaneously upsetting the remaining head portion projecting from the die to produce an annular shoulder and bulge at the juncture of the head and shank, further subjecting said head portion to a second impact for further upsetting the head to effect the shaping of the same into substantially frustro conical formation with a rounded shoulder at its juncture with the shank and simultaneously producing at the outer end by pressure a reduced projecting annular boss, entering the shank in a second tapered die and exerting pressure on the head by a tool to simultaneously flatten the opposite sides of the head to produce oppositely outwardly converging faces, rounded opposite end walls and an arcuate lower end face with a similarly formed reduced boss and at the same time finishing the shank to its proper size and taper.

I claim:

1. The herein described method of manufacturing blunt drive pattern horseshoe calks by the cold process consisting in entering one end of an elongated cylindrical high carbon wire section into a tapered die, subjecting the same to an initial impact for forming a tapered shank at one end of the section and simultaneously upsetting the remaining head defining portion projecting from the die to produce a bulge at the juncture of the head and shank, subjecting said head portion to further impact whereby to further upset the head to effect shaping of the same into a substantially frustro conical form with a rounded shoulder at its juncture at the inner end of the shank and simultaneously producing at the outer end a reduced outwardly projecting circular boss and then entering the shank into a die exerting a pressure on the head to simultaneously flatten the opposite sides of the head for producing opposite outwardly converging faces, rounded opposite end walls, an arcuate end face while similarly shaping the boss and at the same time finishing the shank to its proper size and taper.

2. The herein described method of manufacturing blunt drive pattern horseshoe calks by the cold process consisting in entering one end of an elongated cylindrical high carbon steel wire section into a die, subjecting the same to an initial impact for forming a tapered shank at one end of the section to approximately its proper size and taper and simultaneously upsetting the remaining portion projecting from the die to produce an annular shoulder and bulge at the juncture of said portion with the shank, subjecting said portion to a second impact for further upsetting the same to effect the shaping thereof into a substantially frustro conical form with a rounded shoulder at the juncture of its inner end with the shank and simultaneously producing at the outer end a reduced outwardly projecting annular boss, then entering the shank into a second tapered die and exerting a pressure on the projecting portion to shape a head provided with flattened opposite sides presenting outwardly converging faces, rounded opposite end walls and an arcuate lower end face with a similarly formed boss and at the same time finishing the shank in said second die to its proper size and taper.

3. The herein described method of manufacturing blunt drive pattern calks by the cold process consisting in feeding high carbon steel wire into a double stroke header, cutting off the same into the required lengths, carrying over and entering one end of each said lengths into a tapered die, striking the portion projecting from the die with a punch tool to form the shank to approximately its proper size and taper and simultaneously forming the projecting portion with an annular bulge adjacent its juncture with the shank, subjecting the projecting portion to a second stroke to change the same to substantially a frustro conical shape with a rounded shoulder at the juncture with the shank, placing the shank in the tapered die of a toggle press, subjecting the projecting portion to a pressure between the sliding jaws for flattening the opposite sides to provide outwardly converging faces, rounded end walls and an arcuate bottom wall and simultaneously finishing the shank to its proper size and taper.

THOMAS F. BOYLAN, Sr.